(12) United States Patent
Tseng et al.

(10) Patent No.: US 6,616,052 B2
(45) Date of Patent: Sep. 9, 2003

(54) DIGITAL BUSINESS CARD

(75) Inventors: Tzu-Feng Tseng, Hsin-Chu Hsien (TW); Yung-Cheng Hsieh, Yun-Lin Hsien (TW); Tung-Kuei Lu, Hua-Lien (TW)

(73) Assignee: Ritek Corporation, Hsin-Chu Hsien (TW)

( * ) Notice: Subject to any disclaimer, the term of this patent is extended or adjusted under 35 U.S.C. 154(b) by 0 days.

(21) Appl. No.: 09/683,211

(22) Filed: Dec. 3, 2001

(65) Prior Publication Data

US 2002/0053595 A1 May 9, 2002

(30) Foreign Application Priority Data

Dec. 5, 2000 (TW) ........................................ 89125868 A

(51) Int. Cl.[7] .............................................. G06K 19/00
(52) U.S. Cl. ...................... 235/487; 235/493; 235/382; 235/382.5; 369/272; 369/273
(58) Field of Search ................................ 235/493, 487; 369/273, 272, 382, 382.5

(56) References Cited

U.S. PATENT DOCUMENTS

| | | | | |
|---|---|---|---|---|
| 3,949,501 A | * | 4/1976 | Andrews et al. | 283/82 |
| 4,812,633 A | * | 3/1989 | Vogelgesang et al. | 235/487 |
| 4,868,373 A | * | 9/1989 | Opheij et al. | 235/380 |
| 4,916,687 A | * | 4/1990 | Endo | 369/111 |
| 5,059,774 A | * | 10/1991 | Kubo et al. | 235/454 |
| 5,936,542 A | * | 8/1999 | Kleinrock et al. | 340/5.61 |
| 6,016,298 A | * | 1/2000 | Fischer | 369/75.1 |
| 6,078,557 A | * | 6/2000 | Pierson | 369/273 |
| D429,733 S | * | 8/2000 | Jones et al. | D14/479 |
| 6,160,769 A | * | 12/2000 | Ohnuki et al. | 369/13.13 |
| 6,215,752 B1 | * | 4/2001 | Kabasawa | 369/77.2 |
| 6,328,209 B1 | * | 12/2001 | O'Boyle | 235/380 |

* cited by examiner

Primary Examiner—Karl D. Frech
Assistant Examiner—Daniel A Hess
(74) Attorney, Agent, or Firm—Winston Hsu

(57) ABSTRACT

A digital business card has a rectangular substrate and a magnetic stripe. The substrate has a printing surface disposed on a surface of the substrate for printing visual data, and a photo-recording region disposed on the rear of the substrate for storing digital data. The magnetic stripe is disposed on the surface of the substrate adjacent to a short side of the substrate for recording magnetic recording data and storing a specific encoded password. The digital business card effectively controls reading data in the digital business card through the combination of the magnetic stripe and the photo-recording region so as to prevent the data from being stolen. Besides, the digital business card has the same size as a conventional printed business card, so that the digital business card is carried handily and has high capacity of storing data.

18 Claims, 3 Drawing Sheets

DIGITAL BUSINESS CARD

BACKGROUND OF INVENTION

1. Field of the Invention

The present invention relates to a digital business card, and more particularly, to a digital business card with a magnetic stripe for recording user data.

2. Description of the Prior Art

The utilization of conventional printed business cards is fairly extensive for introducing an individual or a company to others. The printed business card generally records fundamental information such as the name, title, address, or telephone number of the individual or the company. For convenience, the conventional printed business card has a standard size of 9 cm×5.5 cm. Since the size of the printed business card is fixed, the amount of information that can be recorded is restricted. Therefore, except for the fundamental information described above, other useful information such as personal publications, academic backgrounds, professional backgrounds, or company catalogs cannot be recorded on the limited sheet of paper.

Nevertheless, with the prevalence of computers, all kinds of data can be stored as computer files in various forms such as document files, data structures, diagrams, or multimedia files. Thus, a portable recording media used in a computer system may be capable of replacing the conventional printed business card for recording the personal data. Typically, the portable recording media can be a magneto-optical (MO) storage disk or a floppy disk. The MO disk uses basic principles of writing magnetically with thermal assistance and reads data optically using a laser. Unfortunately, the MO disk is not popular enough to be used everywhere, and the floppy disk has a disadvantage of small capacity. Neither is suitable to substitute for the conventional printed business card.

Recently, a CD-ROM drive has become a basic peripheral device for a computer. A compact disc can store a huge amount of data and has advantages of low price and popularity. However, a person cannot conveniently carry the present compact disc, and an improvement is thus needed. Additionally, all data stored in the prior art compact disc is entirely presented to one who browses the compact disc. Even when the owner of the compact disc does not wish to present the data in the compact disc to a specific person, the data still cannot be hidden. Consequently, the data stored in the compact disc is likely to be leaked out or be stolen by others.

SUMMARY OF INVENTION

It is therefore a primary objective of the claimed invention to provide a digital business card to solve the above-mentioned problems.

According to the claimed invention, the claimed invention provides a digital business card comprising a rectangular substrate and a magnetic stripe. The substrate has a printing surface disposed on a surface of the substrate for printing visual data, and a photo-recording region disposed on the rear of the substrate for storing digital data. The magnetic stripe is disposed on the surface of the substrate adjacent to a short side of the substrate for recording magnetic recording data and storing a specific encoded password.

It is an advantage of the claimed invention that the digital business card according to the claimed invention effectively controls reading of the data in the digital business card through the combination of a magnetic stripe and the digital business card so as to prevent the data from being stolen.

It is a further advantage of the claimed invention that the digital business card according to the claimed invention has the same size as a conventional printed business card, so that the digital business card is carried handily and has high capacity of storing data.

These and other objectives and advantages of the claimed invention will no doubt become obvious to those of ordinary skill in the art after reading the following detailed description of the preferred embodiment that is illustrated in the various figures and drawings.

DETAILED DESCRIPTION

Figure 1:
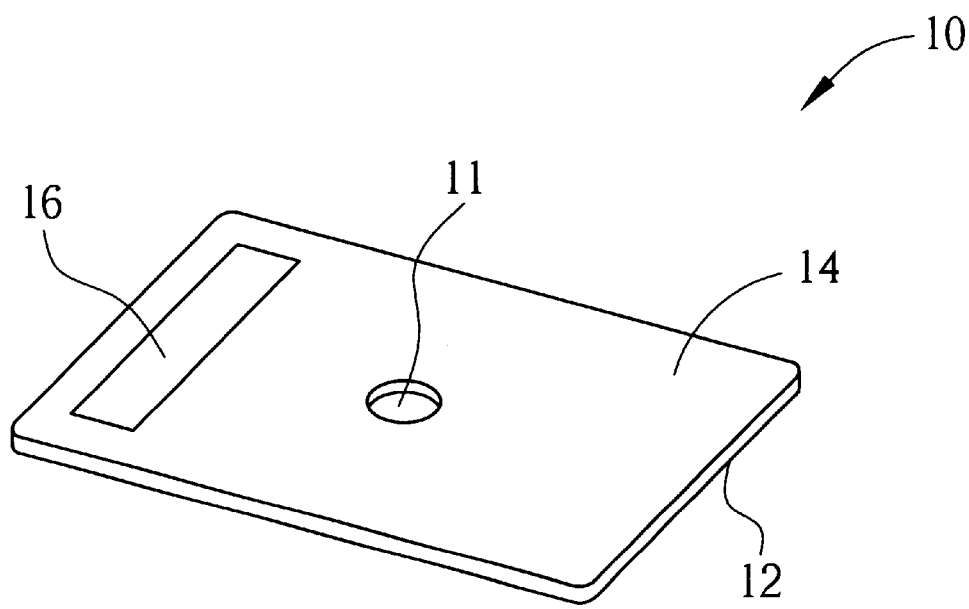
FIG. 1 is a front view of a digital business card according to a preferred embodiment of the present invention.

Please refer to FIG. 1. FIG. 1 is a front view of a digital business card 10 according to a preferred embodiment of the present invention. The digital business card 10 comprises a substrate 12 and a magnetic stripe 16. The substrate 12 may have the same size as a rectangular printed business card. A printing surface 14 is disposed on the front of the substrate 12 for printing visual data such as the name, title, address, and telephone number of an individual and a company. The magnetic stripe 16 is disposed on a surface of the digital business card 10 for recording and storing magnetic recording data. In the preferred embodiment, the magnetic stripe 16 is positioned on the printing surface 14 of the digital business card 10 adjacent to a short side of the digital business card 10.

Figure 2:
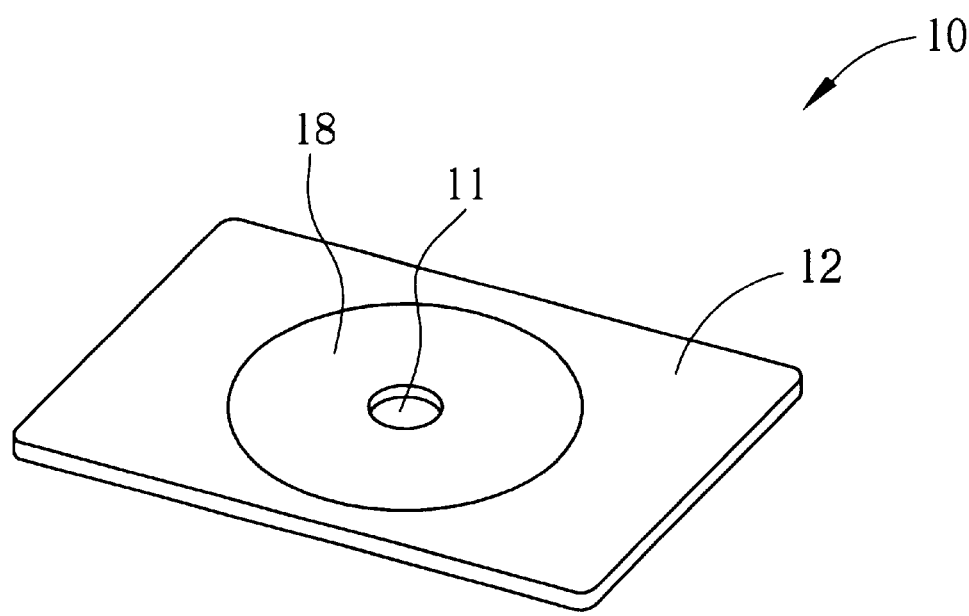
FIG. 2 is a rear view of the digital business card according to the preferred embodiment of the present invention.

Please refer to FIG. 2. FIG. 2 is a rear view of the digital business card 10 according to the preferred embodiment of the present invention. A photo-recording region 18 is disposed on the rear of the substrate 12 for storing digital data, and a hole 11 is installed concentrically within the center of the photo-recording region 18. According to the preferred embodiment of the present invention, the photo-recording region 18 is composed of dye or phase-change material. When the photo-recording region 18 is composed of dye, the photo-recording region 18 is a read-only type. On the other hand, when the photo-recording region 18 is composed of phase-change material, the photo-recording region 18 is a re-writable type.

Please refer to FIGS. 1 and 2. According to the preferred embodiment, the substrate 12 has a rectangular shape and is manufactured in an injection molding process. During the fabrication process, the photo-recording region 18 is first formed on the rear of the substrate 12, and then the printing surface 14 on the front of the substrate 12 is printed with the visual data. After completing the printing process, the magnetic stripe 16, which is composed of ferric oxide, is stuck on the printing surface 14 adjacent to a short side of the substrate 12. Thereafter, a password is encoded onto the magnetic stripe 16 so as to complete the fabrication of the digital business card 10. If so desired, the photo-recording region 18 could be formed on the front of the substrate 12 instead of being formed on the back of the substrate 12. When the photo-recording region 18 is disposed on the front of the substrate 12, it is necessary to prevent the photo-recording region 18 from being covered with the printing surface 14 to ensure that reading the data in the photo-recording region 18 is not interfered with.

Additionally, the substrate 12 of the digital business card 10 may also be manufactured in a round shape during an injection molding process. Likewise, during the fabrication process, the photo-recording region 18 is first formed on the round substrate 12, and then the printing surface 14 is printed with the visual data. After completing the printing process, the round substrate 12 is cut into a rectangular shape. Thereafter, the magnetic stripe 16 is stuck on the printing surface 14 adjacent to the short side of the substrate 12. Finally, the password is encoded onto the magnetic stripe 16 so as to complete the fabrication of the digital business card 10. Since the digital business card 10 utilizes a compact disc to store data, the digital business card 10 can store a huge amount of data such as personal data, company introduction, production catalogs, multimedia digital data, hypertext, and so forth. This advantage of the digital business card 10 according to the present invention did not exist in the prior art printed business card.

Figure 3:
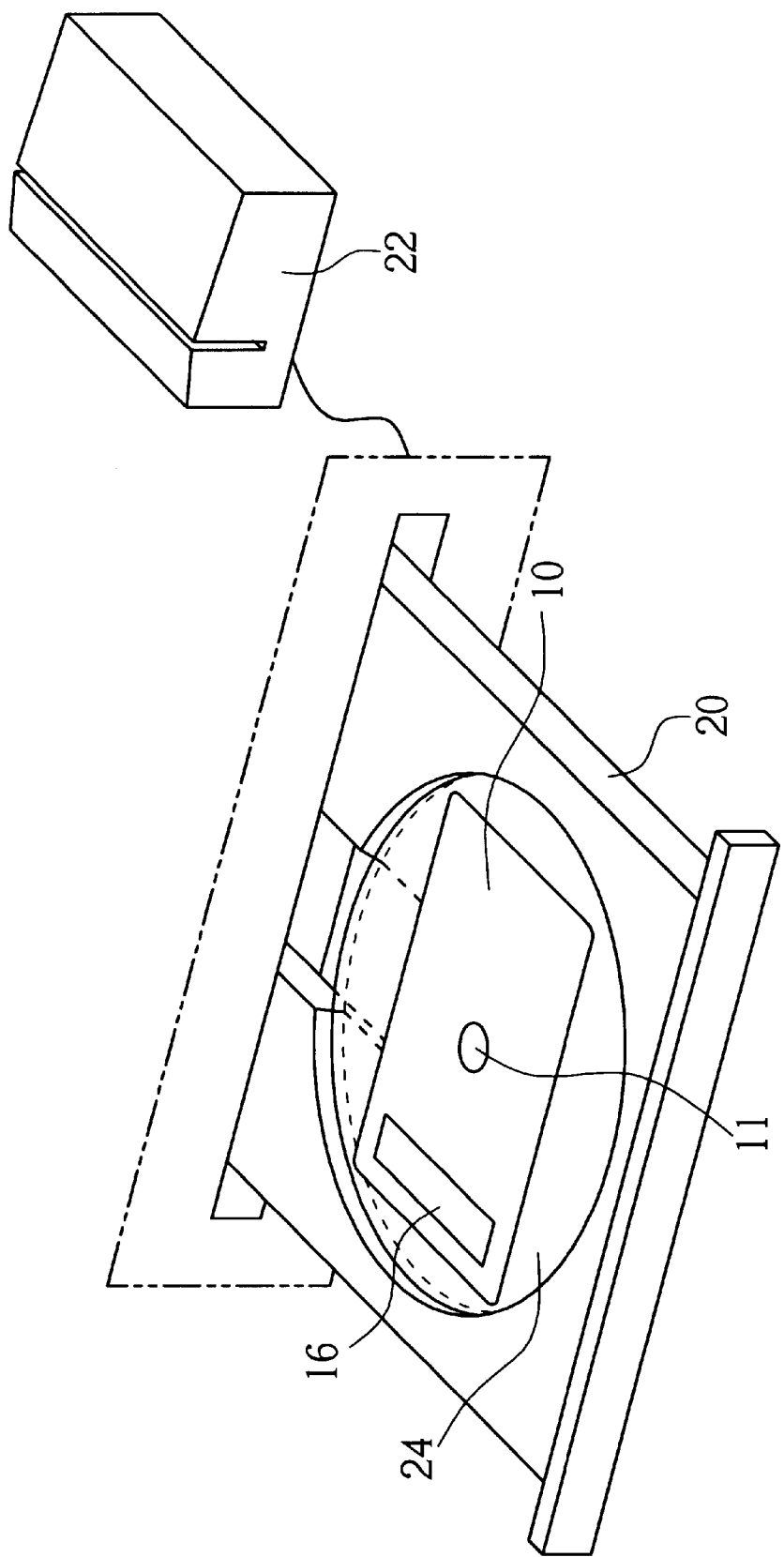
FIG. 3 is a schematic diagram illustrating the arrangement of the digital business card in a computer system according to the preferred embodiment of the present invention.

Please refer to FIG. 3. FIG. 3 is a schematic diagram illustrating the arrangement of the digital business card 10 in a computer system according to the preferred embodiment of the present invention. When a user desires to read the data stored in the digital business card 10, the magnetic stripe 16 is first scanned in a card reader 22 electrically connected to the computer. Then, the digital business card 10 is placed into a card pad 24, which has the identical contours of a disc tray 20 with a diameter of approximately 120 mm. Additionally, an opening 26 is installed inside the card pad 24 for securing the digital business card 10. After securing the digital business card 10 onto the card pad 24, the card pad 24 and the digital business card 10 are simultaneously placed onto the disc tray 20 of a CD-ROM drive so as to read the data stored in the photo-recording region 18 of the digital business card 10.

Before reading the data stored in the photo-recording region 18, the user is requested to input a password via an input device such as a keyboard of the computer system. Then, the computer compares the inputted password with the password stored in the magnetic stripe 16. If the two passwords are identical, the user can read the data stored in the photo-recording region 18 of the digital business card 10. Since the user is requested to input a password for reading the data in the digital business card 10, the data in the digital business card 10 has protection from being stolen.

Figure 4:
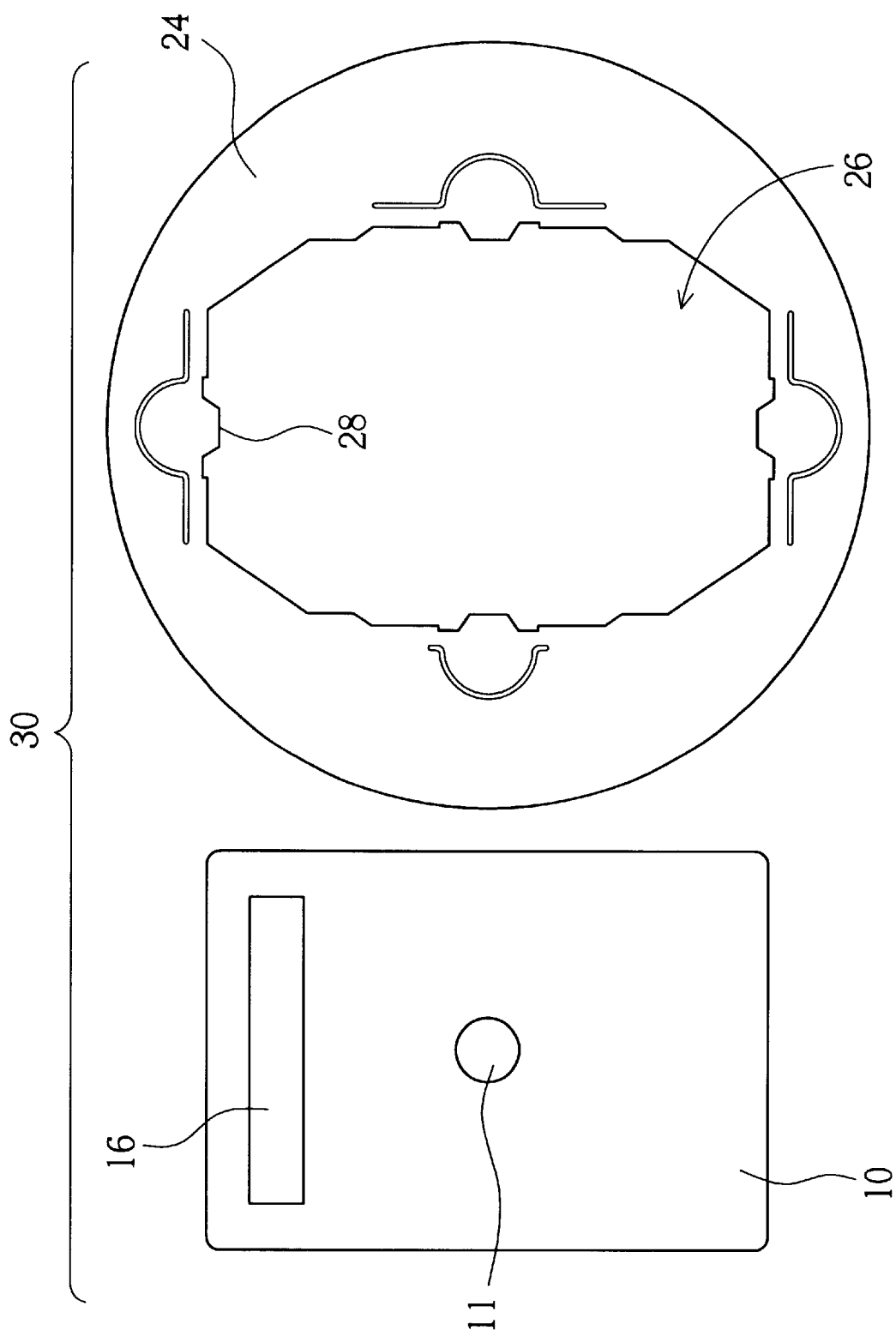
FIG. 4 is a schematic diagram illustrating the assembly of the digital business card into a card pad according to the preferred embodiment of the present invention.

Please refer to FIG. 4. FIG. 4 is a schematic diagram illustrating the assembly 30 of the digital business card 10 into the card pad 24 according to the preferred embodiment of the present invention. As previously described, the card pad 24 provides the opening 26, which has a plurality of fixing mechanisms 28 on the edges of the opening, for fixing the digital business card 10 onto the card pad 24. Furthermore, the opening 26 has an identical shape as the digital business card 10. With this card pad 24, the digital business card 10 can be inserted into the disc tray 20 of the CD-ROM drive more easily and conveniently.

In contrast to the prior art printed business card, the digital business card according to the present invention has the following advantages. First, the digital business card utilizes a compact disc to store data. Thus, a huge amount of complicated data, such as personal data, company introduction, production catalogs, multimedia digital data, and hypertext, can be recorded in the digital business card. Second, after placing the digital business card into a CR-ROM drive, a user is requested to input a correct password for reading the data in the digital business card. Therefore, the data in the digital business card is protected from being stolen. Finally, the digital business card according to the present invention has the same size as a prior art printed business card, so that the digital business card is carried handily.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A digital business card comprising:
   a substrate having:
      a printing surface disposed on a surface of the substrate for printing visual data; and
      an optical recording region disposed on the rear of the substrate for storing digital data; and
      a magnetic stripe disposed on a surface of the digital business card for recording magnetic recording data and protecting the digital data stored in the optical recording region from being stolen.

2. The digital business card of claim 1 wherein the magnetic stripe is capable of storing a specific encoded password.

3. The digital business card of claim 1 wherein the magnetic stripe is composed of ferric oxide.

4. The digital business card of claim 1 wherein the digital business card has the same size as a printed business card.

5. The digital business card of claim 1 wherein the digital business card has a rectangular shape.

6. The digital business card of claim 1 wherein the magnetic stripe is disposed on the surface of the substrate adjacent to a short side of the substrate.

7. The digital business card of claim 1 wherein the photo-recording region is composed of dye.

8. The digital business card of claim 1 wherein the photo-recording region is composed of phase-change material.

9. The digital business card of claim 1 wherein the digital data comprises personal data, company introduction, and production catalogs.

10. A digital business card comprising:
    a substrate having:
       an optical recording region disposed on a surface of the substrate for storing digital data; and
       a printing surface disposed on the front of the substrate for printing visual data; and
       a magnetic stripe disposed on a surface of the digital business card for recording magnetic recording data and protecting the digital data stored in the optical recording region from being stolen.

11. The digital business card of claim 10 wherein the magnetic stripe is capable of storing a specific encoded password.

12. The digital business card of claim 10 wherein the magnetic stripe is composed of ferric oxide.

13. The digital business card of claim 10 wherein the digital business card has the same size as a printed business card.

14. The digital business card of claim 10 wherein the digital business card has a rectangular shape.

15. The digital business card of claim 10 wherein the magnetic stripe is disposed on the surface of the substrate adjacent to a short side of the substrate.

16. The digital business card of claim 10 wherein the photo-recording region is composed of dye.

17. The digital business card of claim 10 wherein the photo-recording region is composed of phase-change material.

18. The digital business card of claim 10 wherein the digital data comprises personal data, company introduction, and production catalogs.

* * * * *